(12) United States Patent
Ikeno et al.

(10) Patent No.: US 8,981,591 B2
(45) Date of Patent: Mar. 17, 2015

(54) SAFETY DEVICE FOR HIGH VOLTAGE COMPONENTS

(75) Inventors: Masayuki Ikeno, Hamamatsu (JP);
Junka Iwasaki, Hamamatsu (JP);
Hiromasa Minami, Hamamatsu (JP)

(73) Assignee: Suzuki Motor Corporation, Hamamatsu-Shi, Shizuoka-Ken (JP)

( * ) Notice: Subject to any disclaimer, the term of this patent is extended or adjusted under 35 U.S.C. 154(b) by 366 days.

(21) Appl. No.: 13/697,186

(22) PCT Filed: May 10, 2011

(86) PCT No.: PCT/JP2011/060725
§ 371 (c)(1),
(2), (4) Date: Dec. 12, 2012

(87) PCT Pub. No.: WO2011/142340
PCT Pub. Date: Nov. 17, 2011

(65) Prior Publication Data
US 2013/0088798 A1 Apr. 11, 2013

(30) Foreign Application Priority Data

May 12, 2010 (JP) .................. 2010-109948

(51) Int. Cl.
H02H 7/18 (2006.01)
H02H 1/06 (2006.01)
H01R 13/447 (2006.01)
H01R 13/713 (2006.01)
B60L 3/04 (2006.01)
B60L 1/00 (2006.01)
B60L 3/00 (2006.01)

(52) U.S. Cl.
CPC ............... *H02H 1/06* (2013.01); *H01R 13/447* (2013.01); *H01R 13/713* (2013.01); *B60L 3/0069* (2013.01); *B60L 3/04* (2013.01); *H01R 2201/26* (2013.01)
USPC .......................................... 307/10.7; 307/10.1

(58) Field of Classification Search
USPC ......................................................... 307/10.7
See application file for complete search history.

(56) References Cited

U.S. PATENT DOCUMENTS

2003/0057958 A1* 3/2003 Fukushima et al. .......... 324/538

FOREIGN PATENT DOCUMENTS

| JP | 1997169249 | 6/1997 |
| JP | 3276324 A | 4/1999 |
| JP | 2000289543 A | 10/2000 |
| JP | 2006136097 A | 5/2006 |

(Continued)

OTHER PUBLICATIONS

Application No. JP-1997-0302003, 2007-0217784, 2005-0149718; Publication No. JP-2006-136097, 2000-289543.*
English Translation of International Preliminary Report on Patentability, PCT/JP2011/060725 filed May 10, 2011.

(Continued)

*Primary Examiner* — Dharti Patel
(74) *Attorney, Agent, or Firm* — Barnes & Thornburg LLP

(57) ABSTRACT

A safety device for a high-voltage component including a cover that covers at least a part of the high-voltage component, a low-voltage circuit that controls a conduction/shut-off state of an electric circuit for supplying power to the high-voltage component, and a selecting unit that selects the conduction/shut-off state of the low-voltage circuit by an operation accompanying an attachment/removal work of the cover.

7 Claims, 8 Drawing Sheets

(56) References Cited

FOREIGN PATENT DOCUMENTS

| | | | |
|---|---|---|---|
| JP | 2006327251 | A | 12/2006 |
| JP | 2009054329 | A | 3/2009 |

OTHER PUBLICATIONS

Search Report for International Patent Application No. PCT/JP2011/060725; Jun. 14, 2011.

* cited by examiner

US 8,981,591 B2

SAFETY DEVICE FOR HIGH VOLTAGE COMPONENTS

PRIORITY CLAIM

This patent application is a U.S. National Phase of International Patent Application No. PCT/JP2011/060725, filed 10 May 2011, which claims priority to Japanese Patent Application No. 2010-109948, filed 12 May 2010, the disclosures of which are incorporated herein by reference in their entirety.

TECHNICAL FIELD

The present invention relates to a safety device for a high voltage component and particularly to a safety device for a high voltage component for protecting an electric component by detecting attachment/removal of a safety cover suitable for a high-voltage electric component in a vehicle such as a hybrid vehicle and an electric automobile.

BACKGROUND ART

In recent years, in vehicles such as hybrid cars, electric cars, and fuel-cell (hybrid) cars, electric components are protected by detecting attachment/removal of a safety cover suitable for a high-voltage electric component.

FIG. 10 illustrates an example of a safety structure or configuration of the above-described electric component. In FIG. 10, a high-voltage connector 101 as an electric component is covered by a cover 102 made of sheet metal so that the high-voltage connector 101 is not in contact with a general user for safety of the high-voltage component. The cover 102 is fixed to a base (base frame member) 105 by mounting bolts inserted through mounting holes 104 and 104 of a mounting plate 103 and mounting holes 106 and 106 of the base 105. Further, a clamp hole 107 for mounting a clamp is formed in the base 105.

A high-voltage main wire 108 is connected to the high-voltage connector 101. In a configuration such that that a high voltage is shut off if the cover 102 is removed is to be employed, a low-voltage circuit 109 is provided as illustrated in FIG. 11.

A high-voltage battery 110 and a high-voltage unit 111 constituting an electric load are connected by a positive-side wire 112 and a negative-side wire 113 arranged in parallel, a high-voltage relay 114 is provided in an intermediate portion of the positive-side wire 112, and a battery wire 116 of an ordinary 12-V battery 115 is connected, as a main wire of the low-voltage circuit 109, to the high-voltage relay 114. An opening/closing detecting unit 117 for detecting an opening/closing state of the cover 102 is connected to the battery wire 116.

The opening/closing detecting unit 117 is arranged at a position P on the base 105 (FIG. 10) at which the opening/closing state of the cover 102 can be detected. As the opening/closing detecting unit 117, a micro switch 118 is provided, for example, as illustrated in FIG. 12. This micro switch 118 connects the positive-side wire 112 and the negative-side wire 113 to a switch main body 119, and flange portions 120 and 120 of the switch main body 119 are fixed to the base 105, and when the cover 102 is brought into contact, the switch is vertically moved and performs an ON/OFF operation.

Furthermore, as the opening/closing detecting unit 117, a receiving switch 121 is used as illustrated in FIG. 13, for example. The receiving switch 121 is formed of a fixed-side connector 122 fixed to the base 105 side and to which the positive wire 112 and the negative wire 113 are connected and a movable-side connector 125 incorporating a bus bar 123, mounted to the cover 102 by a mounting member 124 and detachably attached to the fixed-side connector 122.

PRIOR ART DOCUMENT

Patent Document
Patent Document 1: Japanese Patent Laid-open Publication No. 1997-169249
Patent Document 2: Japanese Patent No. 3276324

In a mounting structure of an electric device for an automobile disclosed in the Patent Document 1, when the electric device is inserted into a mounting opening portion of an article to be mounted, a wire connector on a mounting side and a wire connector on a receiving side are connected to each other by an inserting force.

In a fitting/removing structure of a connector disclosed in the Patent Document 2, at a time of completing the fitting of one of connector members with the other connecting member, these connector members are made slidable to the side of a body to be mounted with respect to a holder in the fitting completing state.

DISCLOSURE OF THE INVENTION

Problems to be Solved by the Invention

However, when a micro switch or a receiving connector is provided, a mechanism becomes complicated, and in order to surely detect the opening/closing of the cover, it is required to precisely set positions of the micro switch and the receiving connector to be installed on a cover and a base (base frame), and therefore, it becomes difficult to adjust ON/OFF setting of detection of opening/closing of the cover, thus being inconvenient.

The present invention has been made in view of the above-described background art, and an object thereof is to provide a safety device for a high-voltage component capable of ensuring safety for reliably shutting off power conduction or distribution before a work on the high-voltage component, prevents occurrence of a handling error in connecting a connector member while a cover is left open even on the way of a service work, for example, and ensuring high productivity with a simple and compact structure.

Means for Solving the Problems

A safety device for a high-voltage component which is provided for achieving the above object includes: a cover that covers at least a part of the high-voltage component; a low-voltage circuit that controls a conduction/shut-off state of an electric circuit for supplying power to the high-voltage component; and a selecting unit that selects the conduction/shut-off state of the low-voltage circuit by an operation accompanying an attachment/removal work of the cover, wherein the selecting unit is provided to allow a part of a main wire of the low-voltage circuit to be detachable by a connector formed of a fixed-side connector member and a movable-side connector member, a plate-shaped member having an insertion opening portion through which one of the fixed-side and movable-side connector members of the connector is inserted and another one of the connector members is not inserted is provided on the cover, the connector is configured so as to operate as a cover opening/closing regulating unit in which the one of the connector members is provided in a fixed manner and the another one of the connector members is connected, via the insertion opening portion, to a part of the one of the connector members inserted through the insertion opening portion, and the cover is removed after the another one of the connector members is removed from the one of the connector members.

The safety device for a high-voltage component having the above-described characteristics may involve the following preferred embodiments.

It may be preferred that the part of the main wire of the low-voltage circuit is folded in a U-shape, the both ends thereof are connected to the another of the connector members so that a removing direction of the cover accords with a fitting direction of the connector, and a disposing direction of the main wire extending from the connector accords with the removing direction of the cover and the fitting direction of the connector.

Furthermore, it may be preferred that a fastening portion for attaching the cover to the high-voltage component is provided on the cover, and a plate-shaped member having the insertion opening portion is provided in the periphery of the fastening portion so as to regulate movement or rotational movement integrally with the cover in a direction other than the removing direction of the cover.

Further, the part of the main wire of the low-voltage circuit provided detachably by the connector may be formed to have a predetermined length and fixed to the cover. The main wire of the low-voltage circuit may be fixed by using an insertion-type clamp, a closed section structure may be integrally formed on the cover, and the clamp may be inserted and attached at a position corresponding to the closed section structure.

It may be also preferred that the one of the connector members is a fixed-side connector member of the connector, the another of the connector members is the movable-side connector member, and the fixed-side connector member is fixed to a frame material provided on a vehicle body frame.

Furthermore, it may be preferred that a diameter of a portion of the fixed-side connector member inserted through the insertion opening portion of the plate-shaped member is set smaller than an inner diameter of the insertion opening portion of the plate-shaped member, and an outer shape of the movable-side connector has a dimension larger than the inner diameter of the insertion opening portion.

Effects of the Invention

According to the safety device for a high-voltage component of the present invention, the safety device can ensure safety for reliably shutting off the power conduction before a work on a high-voltage component, can prevent occurrence of a handling error in connecting a connector with a cover being removed even on the way of a service work, and moreover, can ensure high productivity with a simple and compact structure.

MODE FOR EMBODYING THE INVENTION

In order to achieve the object to ensure safety for reliably shutting off power conduction or distribution before a work on the high-voltage component, to prevent occurrence of a handling error in connecting a connector while a cover is left open even on the way of a service work, for example, and to ensure high productivity with a simple and compact structure, the present invention realizes a safety device for a high-voltage component in which a some part of a main wire is detachably attached by using movable-side and fixed-side connector members constituting a connector, a mounting member having a connector insertion opening (hole) is provided integrally with a cover, and the cover can be removed after the removal of the connector member by connecting the connector member through the insertion opening.

Embodiment

FIGS. 1 to 9 represent an embodiment of the present invention. It is further to be noted that, in the following explanation, terms referring to directions (upper and lower, right and left, front and rear and the like) are described with reference to the illustrated states or in an ordinary standing state of a vehicle.

Figure 8:
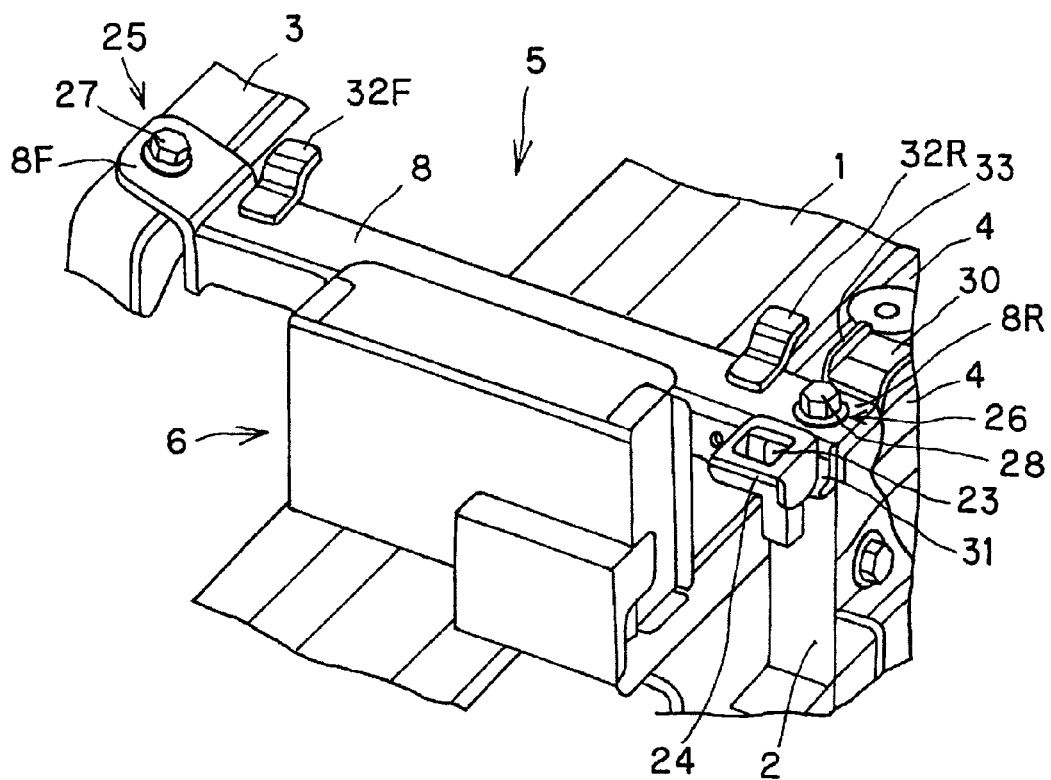
FIG. 8 is a perspective view showing a state in which the cover is attached to the base without the connector.

In FIGS. 4 to 8, reference numeral 1 (FIG. 8) denotes a vehicle body frame of a vehicle such as a hybrid vehicle and an electric automobile, a base 2 (base frame member, frame column: battery frame (base material)) is installed upright on a rear side of the vehicle body frame 1, and a safety device 5 for a high-voltage component according to the present embodiment is laterally extended and arranged between a front cross member 3 and a rear cross member 4 as illustrated in FIG. 8.

The high-voltage component is a power unit, for example, and is composed of electric parts or components including a plurality of battery packs and a converter, high-voltage wires (connection portion, connector and the like) connected to the electric parts, and a frame and a cover holding the electric parts collectively.

The base 2 is arranged on the rear side of the rear cross member 4, and an upper end thereof is located above the rear cross member 4.

The safety device 5 is provided with a rectangular cover 6 which is made of steel metal and covers at least a part of the high-voltage component mentioned above. The cover 6 is composed of a cover main body 7 covering the high-voltage component and a mounting member 8 functioning as a member for integrally connecting the front cross member 3 and the rear cross member 4 to each other by fastening means such as welding.

Figure 3:
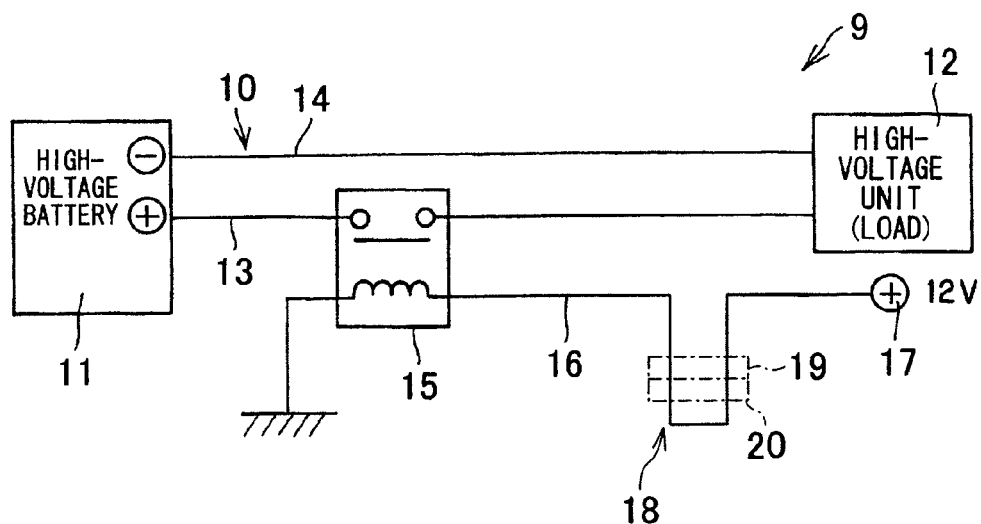
FIG. 3 is an illustrated diagram of a low voltage circuit of the safety device according to the present embodiment.

A low-voltage circuit 9 is provided on the cover main body 7 so as to be capable of controlling a conduction/shut-off state of an electric circuit which supplies power to the high-voltage component. As illustrated in FIG. 3, a conduction/shut-off state can be selected by a manual manipulation or an automatic operation accompanying an attachment/removal work of the cover 6, and the low-voltage circuit 9 is provided with a main wire 10. The main wire 10 is composed of a positive-side wire 13 and a negative-side wire 14 which connect a high-voltage battery 11 and a high-voltage unit 12 as high-voltage components.

A high-voltage relay 15 is provided on the way (in an intermediate portion) of the positive-side wire 13. An ordinary 12-V battery 17 is connected to the high-voltage relay 15 through a battery wire 16 as the main wire 10 of the low-voltage circuit 9.

Furthermore, as illustrated in FIG. 3, the low-voltage circuit 9 is provided detachably by a connector 18. The connector 18 is, as illustrated in FIG. 2, composed of a receiving connector provided with a fixed-side connector (socket side: solid state) 19 and a movable-side connector (plug side: hollow state) 20, for example, and functions as an opening/closing detecting unit (opening/closing detection switch) which detects the opening/closing state of the cover 6.

To the fixed-side connector 19, the positive-side wire 13 and the negative-side wire 14 are connected. The positive-side wire 13 and the negative-side wire 14 are covered with a required protective material.

Figure 2:
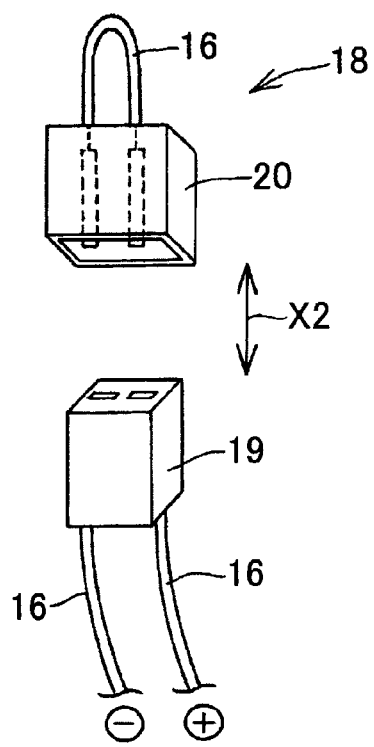
FIG. 2 is a perspective view of a connector functioning as an opening/closing detecting unit of the safety device of the above-described embodiment.

As illustrated in FIG. 2, the movable-side connector 20 is connected to the fixed-side connector 19 in a manner of covering an upper part of the fixed-side connector 19 and of being fitted therein or removed from the fixed-side connector 19 by releasing the fitting.

A U-shaped bus wire 21 projecting upward and curved so as to be connected to the positive-side wire 13 and the negative-side wire 14 of the fixed-side connector 19 is connected to the movable-side connector 20. The bus wire 21 is covered with a protective material 22.

The connector 18 is provided with a function of a conventional detection switch and serves to disconnect the low voltage circuit 9 and turn off the high-voltage relay 15 by removing the movable-side connector 20 from the fixed-side connector 19, and to shut off the high voltage.

Figure 4:
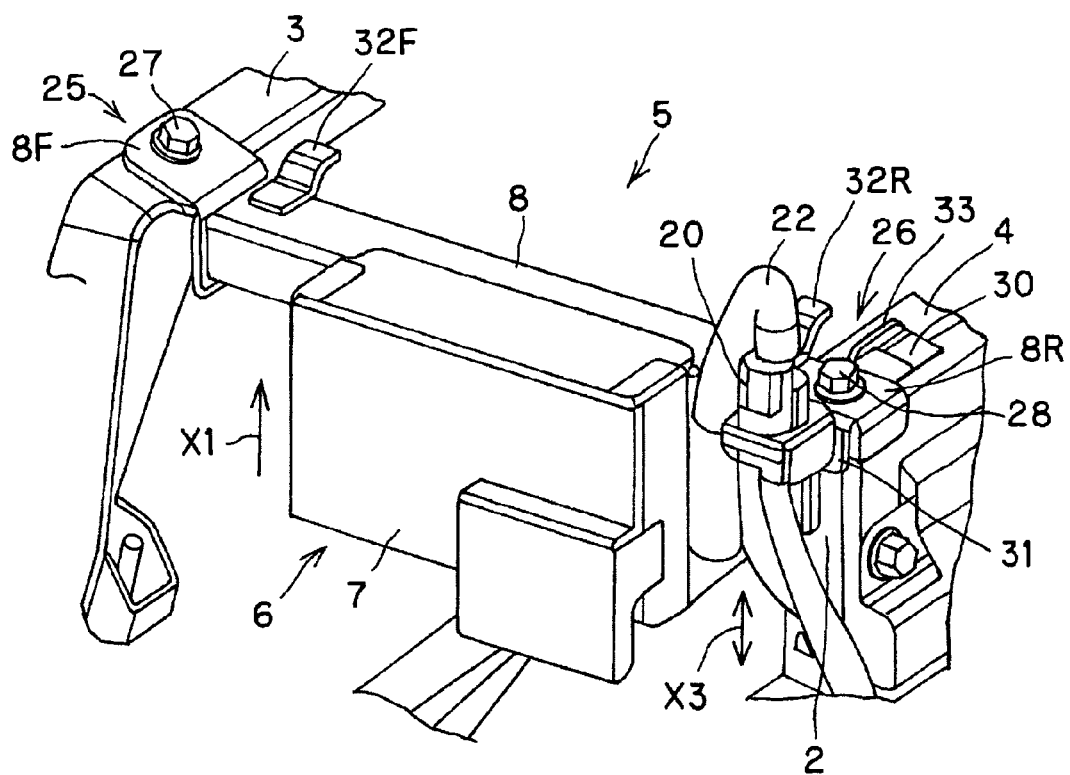
FIG. 4 is a perspective view showing a state where the cover is attached to a base.
Figure 5:
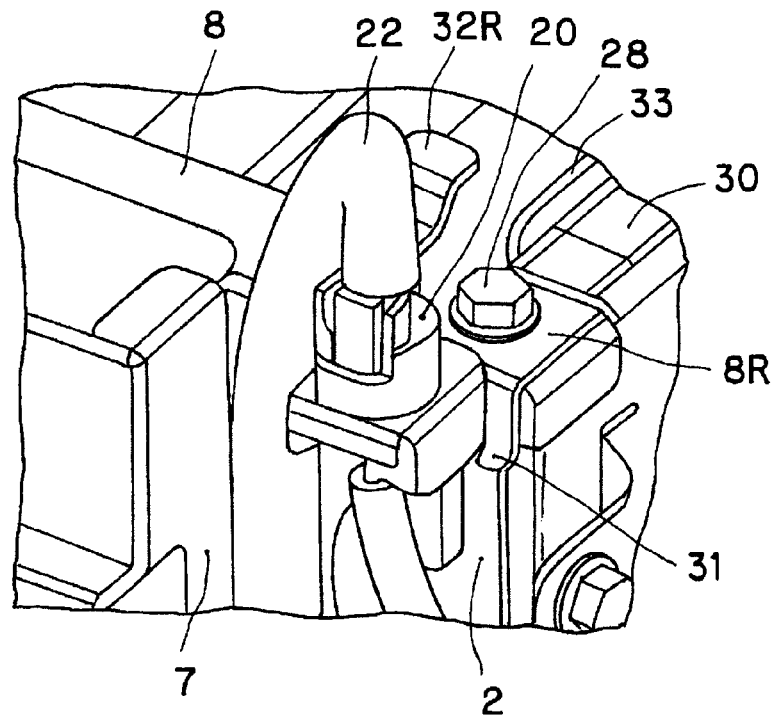
FIG. 5 is a perspective view showing a state where the connector is attached to the cover in an enlarged scale.

As illustrated in FIGS. 4 and 8, on an end portion of the mounting member 8 of the cover 6, the connector 18 is provided integrally by a plate-shaped mounting wall member 24 provided with a hole for connector insertion (insertion opening) 23 through which the fixed-side connector 19, which is one of the connector 18, is insertable and the movable-side connector 20, which is the other of the connector 18, is substantially not insertable. That is, the fixed-side connector 19 is arranged with a fitted portion at the distal end thereof protruding above an upper surface of the plate-shaped mounting wall member 24. In this case, the movable-side connector 20 fitted at the distal end of the fixed-side connector 19 is fixed to the base 2 through the fixed-side connector 19.

Figure 6:
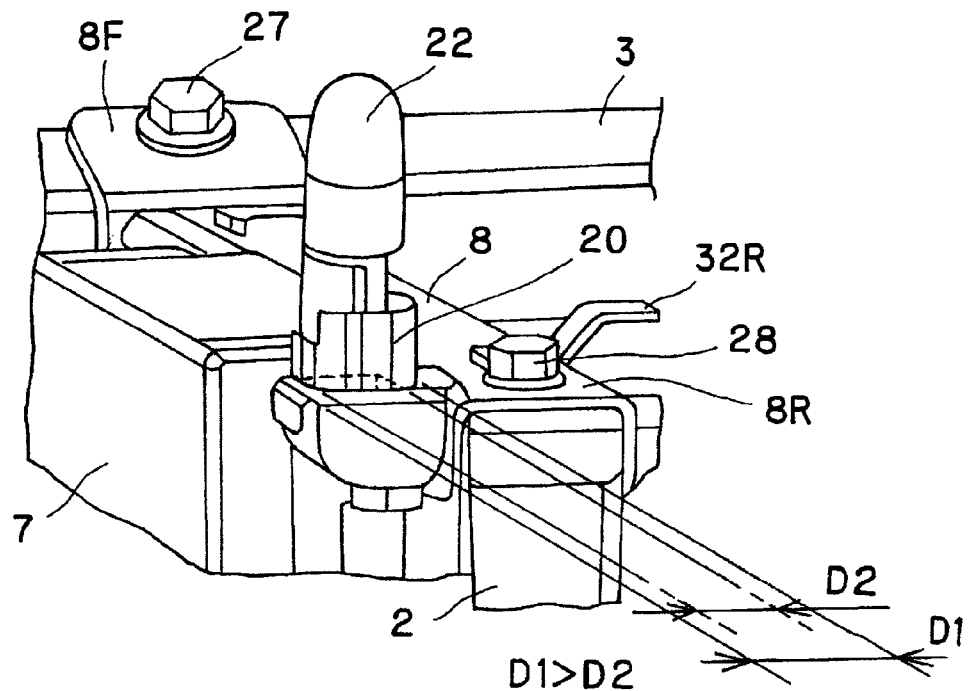
FIG. 6 is a perspective view showing the state where the connector is attached to the cover as viewed from a rear side.
Figure 7:
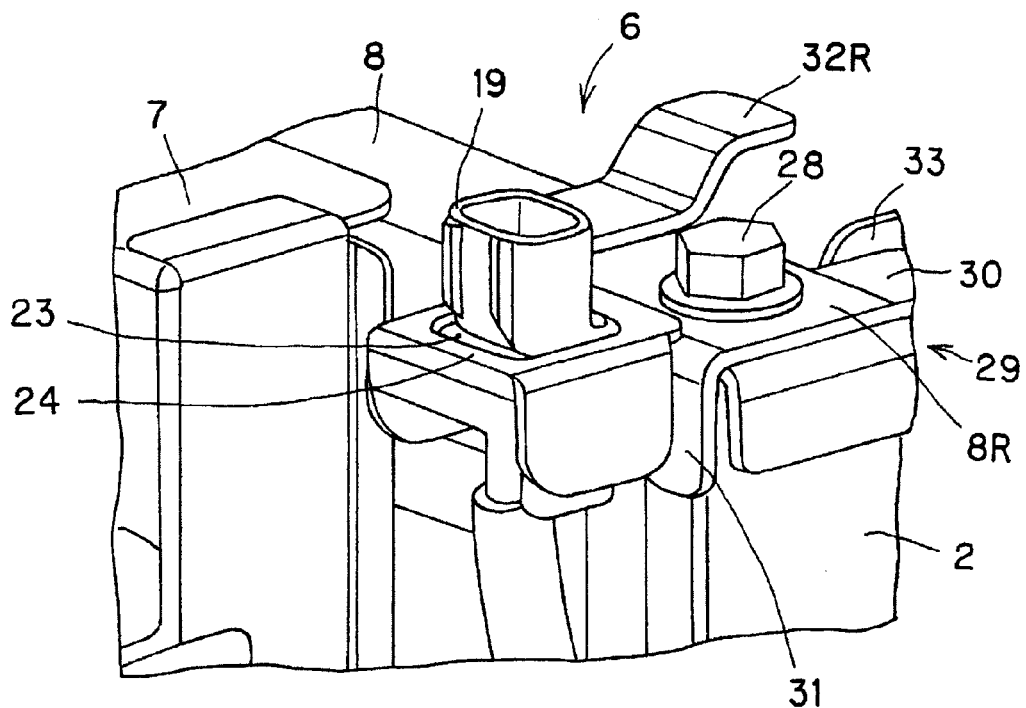
FIG. 7 is a perspective view showing a state where a fixed-side connector member is attached to the cover.

As illustrated in FIG. 6, a diameter D1 of the movable-side connector 20 is formed larger than a diameter D2 of a hole 22. As a result, the cover 6 is configured not to be removed unless the fixed-side connector 19 is removed.

Then, by connecting the movable-side connector 20 which is the other of the connector 18 with the fixed-side connector 19 which is one of the connector 18 through the hole 23, the cover 6 can be removed after the movable-side connector 20 is removed.

According to the structure or configuration mentioned above, the connector 18 and the main wire 10 can function as the opening/closing detecting unit of the cover 6 and can be realized by a general-purpose connector and with standard metal plate working accuracy without a need of an exclusive connector requiring high accuracy, and high productivity can be ensured.

Furthermore, as illustrated in FIGS. 3 to 6, a certain part of the main wire 10 provided detachably is folded in the U-shape and the both ends of the folded part are connected to the movable-side connector 20 which is a single connector.

In this case, as illustrated in FIGS. 2 and 4, a removing direction X1 of the cover 6 accords with a fitting direction X2 of the connector 18. Furthermore, a disposing direction X3 of the main wire 10 extending from the connector 18 accords with the removing direction X1 of the cover 6 and the fitting direction X2 of the connector.

As a result, each part can be aligned in a constant direction, and the entirety can be configured in a simple structure and arranged in a compact manner.

Figure 1:
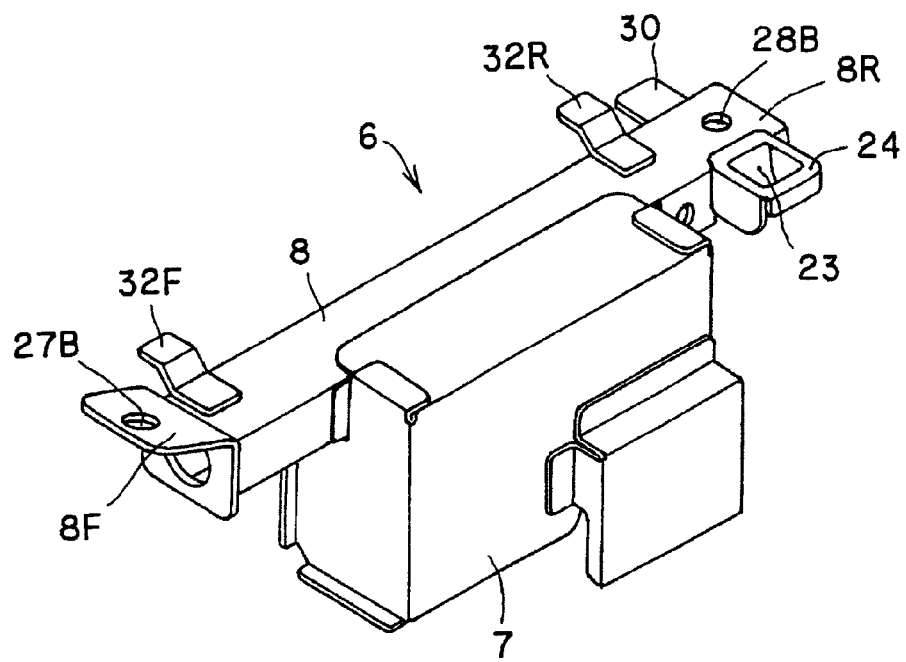
FIG. 1 is a perspective view of a cover of a safety device for a high-voltage component according to an embodiment of the present invention.

Furthermore, as illustrated in FIGS. 4 and 8, a front fastening portion 25 and a rear fastening portion 26 for attaching the cover 6 to the high-voltage component are provided at both ends of the mounting member 8 of the cover 6. The front fastening portion 25 and the rear fastening portion 26 are composed of a front mounting bolt 27 and a rear mounting bolt 28 which fix both end portions 8F and 8R of the mounting member 8 to the upper surfaces of the front cross member 3 and the base 2, respectively, and fix the cover 6 to the base (base frame member) 2. As illustrated in FIG. 1, the front mounting bolt 27 and the rear mounting bolt 28 are inserted through a front bolt hole 27B and a rear bolt hole 28B of the both end portions 8F and 8R of the mounting member 8 and attached to the front cross member 3 and the base 2, respectively.

The cover main body 7 is integrally arranged on the mounting member 8 between the front mounting bolt 27 and the rear mounting bolt 28. The insertion opening 23 is disposed in the periphery of the rear fastening portion 26 as illustrated in FIG. 8.

Furthermore, a mechanical engagement structure 29 is integrally provided on the mounting member 8 of the cover 6. This mechanical engagement structure 29 is composed of a flange portion 30 installed consecutively on a rear end portion of the mounting member 8 and arranged on an upper surface of the rear cross member 4 and a vertical wall 31 installed consecutively on the other side of the end portion of the mounting member 8 on the rear cross member 4 side and locked by a side surface of the base 2. This mechanical engagement structure 29 regulates the movement or rotation (pivotal motion) in a direction other than the removing direction X1 of the cover 6. Moreover, a pair of locking members 32F and 32R is provided on the both end portions of the mounting member 8.

If the movement of an article is to be completely regulated, regulation of the movement in each axial direction and regulation of the rotation around each axis of the three axes, that is, regulation of six (6) degrees of freedom is required. If the fitting direction X2 between the fixed-side connector 19 and the movable-side connector 20 is assigned to one axis, the relationship between the connector 18 and the cover 6 having the insertion opening 23 might not give sufficient regulation particularly for rotational movement around an axis, depending on the dimension of play of the insertion opening 23, for example. Thus, the mechanical engagement structure 29 made of steel metal is adopted so as not to generate such insufficient regulation.

As described above, by adding the mechanical engagement structure 29 such as the flange portion 30 and the vertical wall 31, it becomes impossible to remove the cover 6 with the connector 18 being kept connected, thus improving the reliability thereof.

Moreover, as illustrated in FIG. 8, since the flange portion 30 of the mounting member 8 is brought into contact with a hook portion 33 provided on the rear cross member 4 on the base 2, the movement of or positioning of the mounting member 8 can be regulated. For example, even if the front mounting bolt 27 and the rear mounting bolt 28 are removed, the rotational movement or the like cannot be made unless the engagement is released.

Furthermore, the vertical wall 31 conforming to a shape of a corner portion is provided on the end portion of the mounting member 8, and mutual fitting performs a function similar to that of the flange portion 30. Accordingly, by arranging the vertical wall 31 on the end portion of the flange portion 30 in the vicinity of the cover 6 having the connector 18 and the hole 23, the movement thereof can be regulated efficiently without increasing the outer dimension.

It is further to be noted that the numbers and sizes of the flange portion 30 and the vertical wall 31 may be changed or only either one of them may be provided.

Moreover, as illustrated in FIG. 4, a part of the main wire 10 provided detachably by the connector 18 is formed to have a predetermined length and is fixed to the cover 6.

As a result, occurrence of incidents, during service work, such that only the connector 18 is fitted without the cover 6 and the high-voltage connector 18 is exposed in a state where a voltage is applied due to assembling in a wrong order and the like can be prevented.

Figure 9:
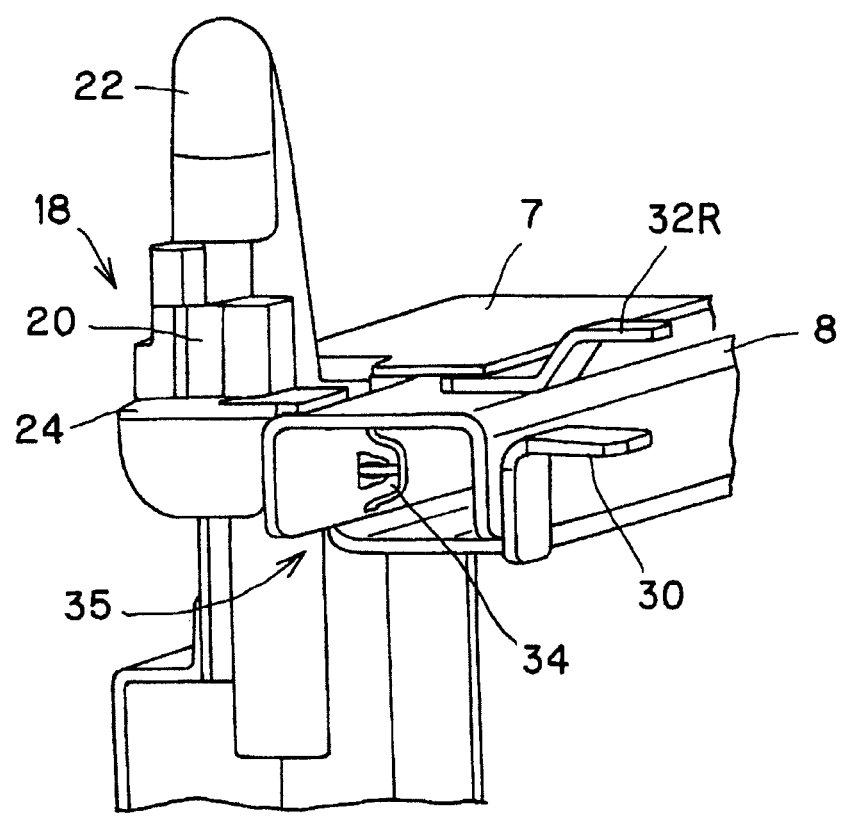
FIG. 9 is a perspective view showing the connector in a state where a clamp is attached.
Figure 10:
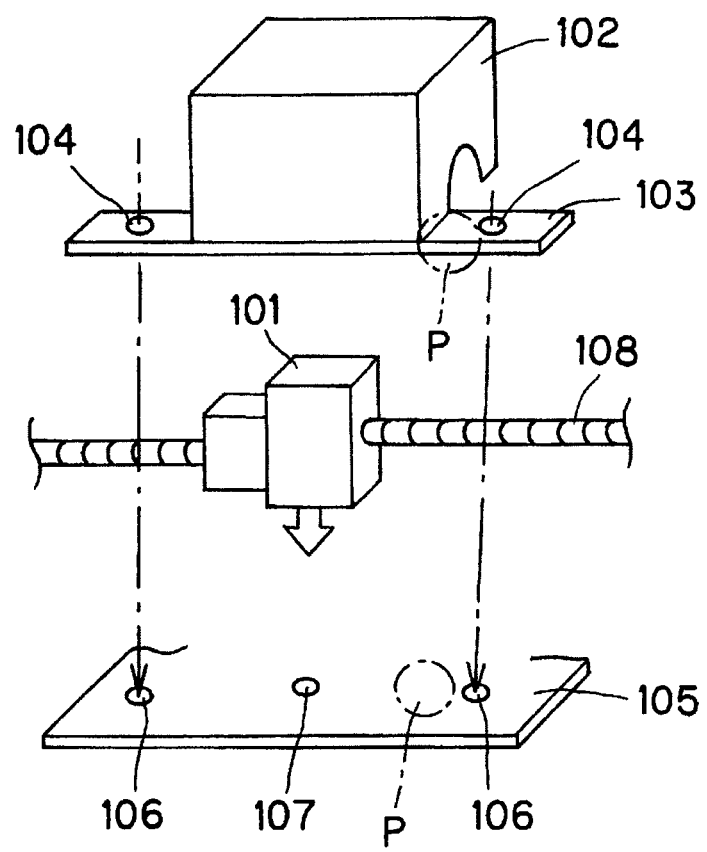
FIG. 10 is an exploded diagram illustrating an assembled state of a high-voltage component and a cover in a prior-art technology.
Figure 11:
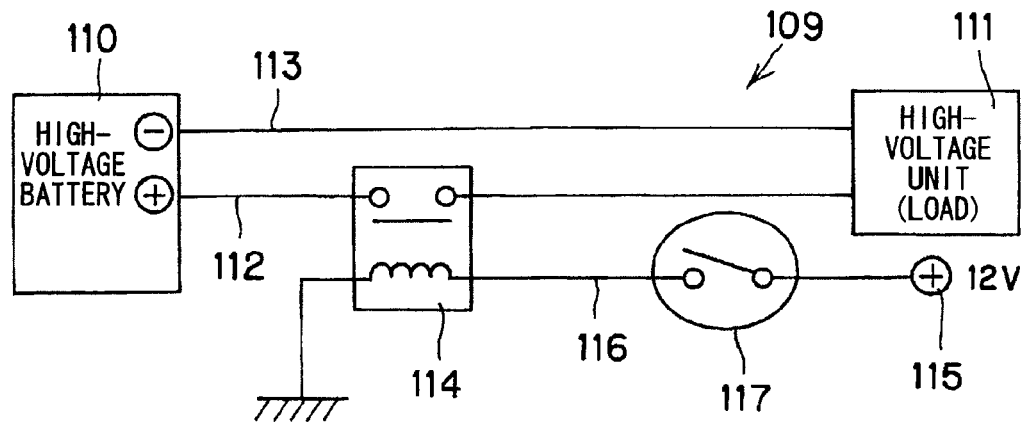
FIG. 11 is an illustrated diagram of the low-voltage circuit in FIG. 10.
Figure 12:
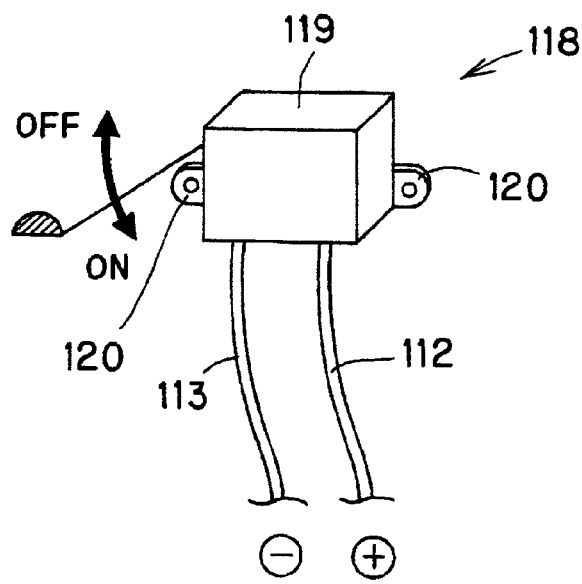
FIG. 12 is a perspective view showing a micro switch as an opening/closing detecting unit in FIG. 10.
Figure 13:
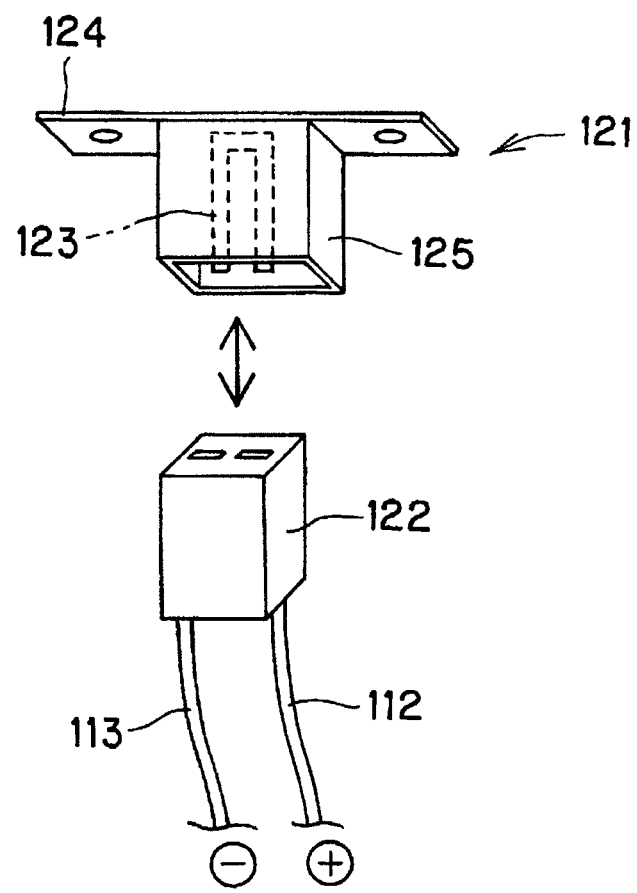
FIG. 13 is a perspective view showing a receiving connector as the above-described opening/closing detecting unit.

Furthermore, as illustrated in FIG. 9, the main wire 10 is fixed by means of an insertion-type clamp 34, the mounting member 8 as a closed section structure 35 is integrally formed on the cover 6, and the clamp 34 is inserted and attached at a position corresponding to such closed section structure 35.

According to such structure, the main wire 10 to which the connector 18 for detecting the fitting is connected can be prevented from being easily manually removed from the cover 6 and from being assembled without the cover 6.

Furthermore, in this case, a margin length in an extending direction of the main wire 10 to be provided is made as short as possible, and a length from the last clamp 34 in front of the fixed-side connector 19 can be set shorter than a height of the vertical wall 31 on the end portion of the mounting member 8.

INDUSTRIAL APPLICABILITY

The safety device for a high-voltage component according to the described embodiment of the present invention can be applied to various types of vehicles.

REFERENCE NUMERALS

1 - - - vehicle body frame
2 - - - base
3 - - - front cross member
4 - - - rear cross member
5 - - - safety device
6 - - - cover
7 - - - cover main body
8 - - - mounting member
9 - - - low-voltage circuit
10 - - - main wire
13 - - - positive-side wire
14 - - - negative-side wire
18 - - - connector
19 - - - fixed-side connector member
20 - - - movable-side connector member
23 - - - insertion hole
25 - - - front fastening portion
26 - - - rear fastening portion
29 - - - mechanical engagement structure
30 - - - flange portion
31 - - - vertical wall
33 - - - hook portion
34 - - - clamp
35 - - - closed section structure

The invention claimed is:

1. A safety device for a high-voltage component, comprising:
a cover that covers at least a part of the high-voltage component;
a low-voltage circuit that controls a conduction/shut-off state of an electric circuit for supplying power to the high-voltage component; and
a selecting unit that selects the conduction/shut-off state of the low-voltage circuit by an operation accompanying an attachment/removal work of the cover, wherein
the selecting unit is provided to allow a part of a main wire of the low-voltage circuit to be detachable by a connector formed of a fixed-side connector member and a movable-side connector member;
a plate-shaped member having an insertion opening portion through which one of the fixed-side and movable-side connector members of the connector is inserted and another one of the connector members is not inserted is provided on the cover;
the connector is configured so as to operate as a cover opening/closing regulating unit in which the one of the connector members is provided in a fixed manner and the another one of the connector members is connected, via the insertion opening portion, to a part of the one of the connector members inserted through the insertion opening portion, and
the cover is removed after the another one of the connector members is removed from the one of the connector members.

2. The safety device for a high-voltage component according to claim 1, wherein the part of the main wire of the low-voltage circuit is folded in a U-shape, both ends thereof are connected to the another one of the connector members so that a removing direction of the cover accords with a fitting direction of the connector, and a disposing direction of the main wire extending from the connector accords with the removing direction of the cover and the fitting direction of the connector.

3. The safety device for a high-voltage component according to claim 2, wherein a fastening portion for attaching the cover to the high-voltage component is provided on the cover, and a plate-shaped member having the insertion opening portion is provided in a periphery of the fastening portion so as to regulate movement or rotational movement integrally with the cover in a direction other than the removing direction of the cover.

4. The safety device for a high-voltage component according to claim 2, wherein the part of the main wire of the low-voltage circuit provided detachably by the connector is formed to have a predetermined length and fixed to the cover.

5. The safety device for a high-voltage component according to claim 4, wherein the main wire of the low-voltage circuit is fixed by using an insertion-type clamp, a closed section structure is integrally formed on the cover, and the clamp is inserted and attached at a position corresponding to the closed section structure.

6. The safety device for a high-voltage component according to claim 1, wherein the one of the connector members is a fixed-side connector member of the connector, the another one of the connector members is the movable-side connector member, and the fixed-side connector member is fixed to a frame material provided on a vehicle body frame.

7. The safety device for a high-voltage component according to claim 6, wherein a diameter of a portion of the fixed-side connector member inserted through the insertion opening portion of the plate-shaped member is set smaller than an inner diameter of the insertion opening portion of the plate-shaped member, and an outer shape of the movable-side connector has a dimension larger than the inner diameter of the insertion opening portion.

* * * * *